No. 610,731. Patented Sept. 13, 1898.
W. H. YOUNG.
BALING PRESS.
(Application filed Mar. 11, 1898.)
(No Model.)

Witnesses:
A. W. Hatch
J. H. Claypool

Inventor:
Washington H. Young
By E. T. Silvius,
Attorney.

THE NORRIS PETERS CO., PHOTO-LITHO., WASHINGTON, D. C.

UNITED STATES PATENT OFFICE.

WASHINGTON H. YOUNG, OF INDIANAPOLIS, INDIANA.

BALING-PRESS.

SPECIFICATION forming part of Letters Patent No. 610,731, dated September 13, 1898.

Application filed March 11, 1898. Serial No. 673,492. (No model.)

*To all whom it may concern:*

Be it known that I, WASHINGTON H. YOUNG, a citizen of the United States, residing at Indianapolis, in the county of Marion and State of Indiana, have invented certain new and useful Improvements in Baling-Presses; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to that class of baling-presses which are operated manually for pressing hay and the like into suitable packages or bales for convenient handling and in which such bales are tied or secured while under pressure; and it consists in certain new and novel elements in the details of construction and the adaptation of parts and in the combination thereof whereby such presses are improved, as will be more fully described hereinafter and pointed out in the claim.

Figure 1:
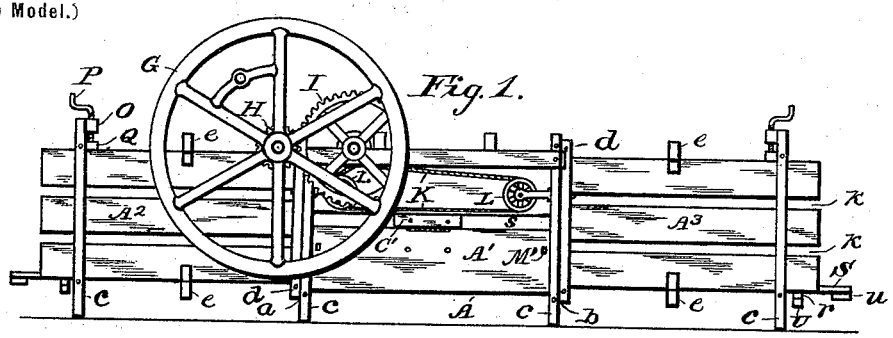
Figure 2:
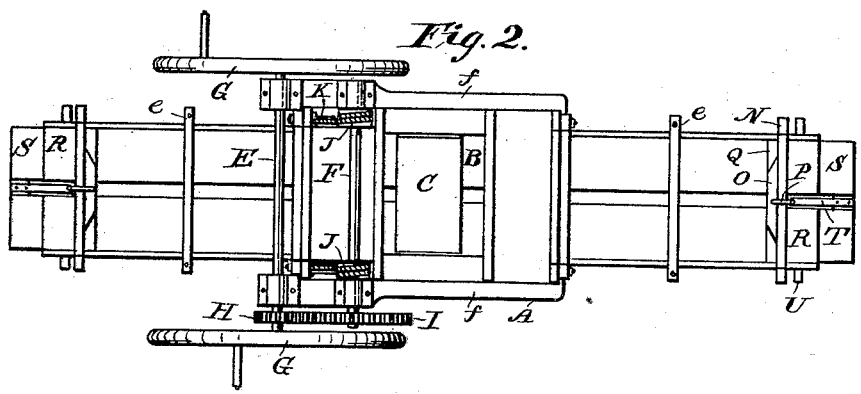
Figure 3:
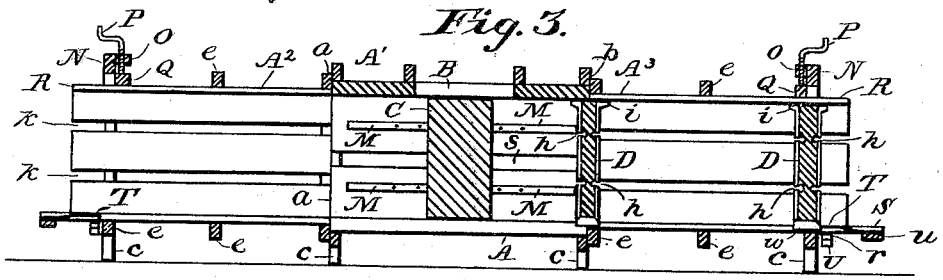
Figures 4, 5:
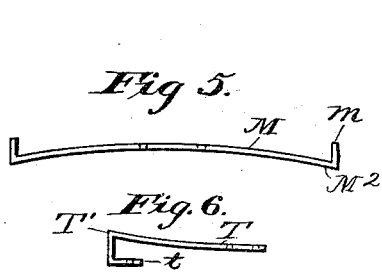
Figure 6:

Referring to the drawings, Figure 1 represents a side elevation of my improved baling-press; Fig. 2, a top plan view; Fig. 3, a central longitudinal vertical sectional view of the body portion; Fig. 4, a central longitudinal horizontal sectional view of half the length of the body portion; Fig. 5, a top view of one of the check-springs, and Fig. 6 a side view of one of the stop-springs.

In the drawings, A designates the body, and $A'$ $A^2$ $A^3$ the three sections of which the body is formed; C, the press-head; D, the dividing-heads; E, the driving-shaft; F, the power-shaft; G, the driving-wheel; J J, the windlasses; K, the power-cable; M M, the check-springs; P P, the compression-screws, and T T the stop-springs.

The body A is composed of three detachable sections, each built separately of suitable timbers and braced so as to be capable of being shipped or handled independently, and are suitably bolted together at $a$ and $b$ in alinement to form a complete whole when in use. The body is rectangular in cross-section. The central section $A'$ is essentially the press and contains or supports the whole power mechanism, and the end sections $A^2$ and $A^3$ are the forms in which the bale is pressed and bound. The central section $A'$ comprises a four-sided casing having open ends and is constructed of heavier material than that of the connected sections. The top has a feed-opening B, and each side has a longitudinal slot $s$ through which the runners $C'$ of the press-head C protrude. The head C is a substantial rectangular block formed, preferably, of built-up timbers and works as a piston in the casing, being propelled by means of a cable K at each side and attached to the runners $C'$, one of which is firmly secured at each side of the head. A frame $ff$ is attached to the upper outside portion of the section, upon which is mounted and journaled in suitable boxes a driving-shaft E, to which is secured a pinion H and also one or two driving-wheels G, serving as hand-wheels, to which the manual power is applied. A power-shaft F is also suitably journaled on the frame $ff$ and has secured to it a gear-wheel I, meshing with the pinion H, and also a pair of windlasses J J. Each windlass has the two ends of a cable secured to it, and each cable passes over pulleys L L, secured at opposite ends of the outside of the casing or its frame, and is firmly secured to the runner $C'$, so that a rotation of the windlasses in either direction causes the head C to travel in its casing. Each inner side of the casing is provided with preferably two check-springs M M, formed of flat bar-steel and let in flush with the surface of the side when compressed and firmly secured to the sides. The ends $m$ are turned outward at an acute angle and work in suitable slots $M'$ in the sides of the casing, and when the head C does not force the ends $M^2$ against the sides of the casing they normally spring away and automatically check the dividing-head D and prevent its being forced back by the pressure of the bale at the opposite side.

The sections $A^2$ and $A^3$ are substantially alike and are rectangular and of the same internal dimensions as the central section in cross-section. A description of one, therefore, will suffice for both. One end is adapted to abut against the central section, to which it is detachably secured by suitable bolts. The ends are open, and at the outer end the bottom S protrudes somewhat, the extreme end having at the under side a cleat $u$, to which is secured in the opening S' of the bottom the stop-spring T, having the end T' normally raised above the under side of the bottom S, but not above its upper surface. The stop is made of flat bar-steel and has a return end t, which is connected to the foot-lever U, suitably fulcrumed on the blocks r, so that pressing down on either of the outer ends of the lever forces the spring-stop down below the bottom of the bottom S. The ends R of the top are free and may be forced downward by means of the screw P, pressing against the cleat Q, secured to the top ends R. The screw works in a suitably-threaded hole in the piece O, secured to the beam N.

The dividing-heads, of which two are used at each end of the press, are adapted to form squared and even ends to the bales and to insure approximately uniform length. At the top side edges each has a guide i, and centrally at the bottom is a stop w, running in the opening S', and is engaged by the stop-spring T. Each face has a pair of transverse grooves h, through which the binding-wires for tying the bales are run across from one side to the other of the section and through the openings k in the side, both being in alinement. The faces also preferably have flanges l.

The body has supporting-legs c, which extend up the sides also to form frames or braces, and other suitable braces, as d e, are provided to enable the casings to endure the strains to which they are subjected.

In operation, the head C being drawn to one end of its casing, a dividing-head D is inserted through the feed-opening B, or it may be inserted at the open end of the casing; but the first-mentioned way is preferable. Then a quantity of hay or whatever is to be baled is fed in after the head, and by rotating the wheel G it is pressed outward toward the end of the casing. The screw P is adjusted so that a pressure is brought against the top of the head D, causing a frictional resistance to any desired degree, insuring compactness of the bale as it is being made up. The opposite end of the press is now charged in the same manner, and repeated reciprocating movements of the press-head and alternate feeding completes the operation of forming two bales at the same time, at the end of which the head has been arrested by the stop-spring T. A second dividing-head is now placed behind each bale and forced up until caught by the check-springs M, when, while one person is tying the bale at one end, another may be completing the filling of the opposite end. The bale having been tied, the spring T is forced down, releasing the head D and the bale, which is forced out by the pressure of a following bale. Thus it will be seen that two persons may so operate the press as to form bales continuously.

It will be apparent that there is a great advantage in the use of this press as well as in handling it in transportation, as when disconnected it is readily handled and more safely, while the mechanism remains undisturbed.

Having thus described my invention, what I claim as new, and desire to secure by Letters Patent, is—

In a baling-press, the combination of the central press-section having the open end sections each provided with the open way S', the reciprocating press-head, the power mechanism, the dividing-heads having each the guide i at the upper edges thereof and the stop w centrally at the bottom thereof working in the open way S' and provided with the transverse grooves h, the stop-spring T, and the connecting foot-lever U, substantially as shown and described.

In testimony whereof I affix my signature in presence of two witnesses.

WASHINGTON H. YOUNG.

Witnesses:
WM. C. THOMPSON,
E. T. SILVIUS.